US012725372B2

(12) United States Patent
Lim et al.

(10) Patent No.: US 12,725,372 B2
(45) Date of Patent: Sep. 1, 2026

(54) METHOD AND SYSTEM FOR GROUPING PLURALITY OF DEVICES

(71) Applicant: Samsung Electronics Co., Ltd., Suwon-si (KR)

(72) Inventors: Yeonju Lim, Suwon-si (KR); Youngsun Ryu, Suwon-si (KR); Sehee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 18/685,439

(22) PCT Filed: Aug. 25, 2021

(86) PCT No.: PCT/KR2021/011378
§ 371 (c)(1),
(2) Date: Feb. 21, 2024

(87) PCT Pub. No.: WO2023/027208
PCT Pub. Date: Mar. 2, 2023

(65) Prior Publication Data
US 2024/0355069 A1 Oct. 24, 2024

(51) Int. Cl.
*G06T 19/00* (2011.01)
*H04W 76/10* (2018.01)
*H04W 76/30* (2018.01)

(52) U.S. Cl.
CPC .......... *G06T 19/006* (2013.01); *H04W 76/10* (2018.02); *H04W 76/30* (2018.02)

(58) Field of Classification Search
CPC .... G06T 19/006; H04W 76/10; H04W 76/14; H04W 76/30; G06F 3/01
See application file for complete search history.

(56) References Cited

U.S. PATENT DOCUMENTS

2012/0177067 A1 7/2012 Cho et al.
2021/0132380 A1 5/2021 Wieczorek
(Continued)

FOREIGN PATENT DOCUMENTS

CN 112384880 A * 2/2021 .......... H04L 67/131
IL 304813 A * 9/2023 ............ G06F 3/011
(Continued)

OTHER PUBLICATIONS

International Search Report with English translation dated May 5, 2022; International Appln. No. PCT/KR2021/011378.

*Primary Examiner* — Chante E Harrison
(74) *Attorney, Agent, or Firm* — Jefferson IP Law, LLP

(57) ABSTRACT

The present disclosure proposes a method of a user terminal for grouping a plurality of augmented reality (AR) glasses in a wireless communication system, the method comprising the steps in which: a first user terminal is wirelessly connected to first AR glasses, and the first user terminal executes an application for connection to second AR glasses; the first user terminal recognizes that the second AR glasses are located within a preconfigured distance and angle range; connection information for connection to the first user terminal is transmitted to the second AR glasses; the user terminal is wirelessly connected to the second AR glasses and receives information on the second AR glasses; and the application displays that the first AR glasses, the second AR glasses, and the first user terminal are grouped.

17 Claims, 11 Drawing Sheets

(56) References Cited

U.S. PATENT DOCUMENTS

| | | | | |
|---|---|---|---|---|
| 2021/0209364 | A1 | 7/2021 | Park et al. | |
| 2022/0255995 | A1* | 8/2022 | Berliner | G06F 3/04883 |

FOREIGN PATENT DOCUMENTS

| | | | | | |
|---|---|---|---|---|---|
| JP | 2019057057 | A | * | 4/2019 | G02B 27/017 |
| KR | 10-2015-0123645 | A | | 11/2015 | |
| KR | 10-2016-0085191 | A | | 7/2016 | |
| KR | 10-1763887 | B1 | | 8/2017 | |
| KR | 10-2018-0119410 | A | | 11/2018 | |
| KR | 10-2019-0041608 | A | | 4/2019 | |
| KR | 10-2019-0117415 | A | | 10/2019 | |
| KR | 10-2194456 | B1 | | 12/2020 | |
| KR | 10-2021-0072902 | A | | 6/2021 | |

* cited by examiner

METHOD AND SYSTEM FOR GROUPING PLURALITY OF DEVICES

CROSS-REFERENCE TO RELATED APPLICATION(S)

This application is a U.S. National Stage application under 35 U.S.C. § 371 of an International application number PCT/KR2021/011378, filed on Aug. 25, 2021, the disclosure of which is incorporated by reference herein in its entirety.

TECHNICAL FIELD

The disclosure relates to a method for efficiently grouping a plurality of devices by connecting a UE connected to one device to another device.

BACKGROUND ART

With the development of electronics and communication technologies, wearable devices may come in a more compact and lightweight form factor to be worn on the user's body without discomfort. For example, commercially available wearable electronic devices include head-mounted devices (HMDs), smart watches (or bands), contact lens-type devices, ring-type devices, glove-type devices, shoe-type devices, or clothing-type devices. The head mounting device is a device used while being worn on the user's head or face and may provide augmented reality (AR) to the user. For example, a glasses-type head mounting device providing augmented reality may provide information regarding objects in the form of images or texts to the user in at least a partial space of the user's field of view. The head mounting device may provide virtual reality (VR) to the user. For example, the head mounting device may output independent images to the eyes of the user wearing AR glasses and output the content, provided from a user equipment (UE) to the user, in the form of an image or audio, thereby providing a superb sense of immersion.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using ultra-wide band (UWB). UWB is a wireless communication technology that uses a very wide frequency band of several GHz or more in a baseband without using a wireless carrier.

DETAILED DESCRIPTION OF THE INVENTION

Technical Problem

Electronic devices for virtual reality or augmented reality (hereinafter, AR) may include glasses-type devices (e.g., AR glasses). When the user wears AR glasses, virtual reality or augmented reality may be displayed to the user through the glass portion or display portion.

The AR glasses may display media that is driven and controlled by the user equipment (UE), and there may be one or more AR glasses that interoperate with the UE.

The same media content driven by the UE may be shared by a plurality of users wearing one or more AR glasses.

A plurality of wearable devices may be connected to one UE and be grouped.

The disclosure is not limited to the foregoing embodiments but various modifications or changes may rather be made thereto without departing from the spirit and scope of the disclosure.

Technical Solution

According to various embodiments of the disclosure, as a UE points at AR glasses of another user, a plurality of AR glasses may be connected to one UE to be grouped by reading the screen of the UE of the other user.

According to various embodiments of the disclosure, grouping may be performed by comprising wirelessly connecting a first UE with first AR glasses, executing an application for connecting to second AR glasses by the first UE, measuring a distance and direction to the second AR glasses by the first UE, recognizing that the second AR glasses are positioned within a preset distance and angle range, transmitting connection information for connecting to the first UE to the second AR glasses, wirelessly connecting the UE with the second AR glasses, receiving information about the second AR glasses, and displaying the grouping of the first AR glasses, the second AR glasses, and the first UE on the application.

According to various embodiments of the disclosure, the second AR glasses may release a connection with a second UE and connect with the first UE.

According to various embodiments of the disclosure, there may be proposed wirelessly connecting a UE with first AR glasses, executing an application for connecting to second AR glasses by the UE, generating and displaying a code for grouping on a display of the UE, transferring information about the UE to the second AR glasses through the code for grouping, wirelessly connecting the UE with the second AR glasses, receiving information about the second AR glasses, and displaying the grouping of the second AR glasses and the first UE on the application.

According to various embodiments of the disclosure, there may be proposed a first UE grouping a plurality of augmented reality (AR) glasses in a wireless communication system, comprising a transceiver and a processor configured to wirelessly connect with first AR glasses, execute an application for connecting to second AR glasses by the first UE, measure a distance and direction to the AR glasses, recognize that the second AR glasses are positioned in a preset distance and angle range, transmit, through the transceiver, connection information for connecting to the first UE to the second AR glasses, wirelessly connect with the second AR glasses, receive information about the second AR glasses through the transceiver, and display the grouping of the first AR glasses, the second AR glasses, and the first UE on the application.

According to various embodiments of the disclosure, a connection with a second UE may be released, and a connection with the first UE may be made.

According to various embodiments of the disclosure, there may be proposed a first UE wirelessly connecting to first AR glasses, executing an application for connecting to second AR glasses, generating and displaying a code for grouping on a display of the first UE, transferring, through the transceiver, information about the UE to the second AR glasses through the code for grouping, wirelessly connecting to the second AR glasses, receiving information about the second AR glasses through the transceiver, and displaying the grouping of the first AR glasses, the second AR glasses and the first UE on the application.

According to various embodiments of the disclosure, there may be proposed a method by second AR glasses for grouping with a first UE in a plurality of augmented reality (AR) glasses in a wireless communication system, comprising wirelessly connecting the second AR glasses with a second UE, when the second AR glasses are positioned toward the first UE, receiving connection information for connecting to the first UE from the first UE, releasing the connection with the second UE, transmitting information about the second AR glasses to the first UE, displaying the grouping of the first AR glasses connected with the first UE and the second AR glasses on a display of the second AR glasses, and displaying media content generated by the first UE.

According to various embodiments of the disclosure, when the second AR glasses are positioned toward the first UE, the connection information may be received as the first UE recognizes that the second AR glasses are positioned within a preset distance and angle range.

According to various embodiments of the disclosure, there may be provided a method comprising wirelessly connecting second AR glasses with a second UE, recognizing a code for grouping, generated by the first UE, transferring information about the second AR glasses to the first UE through the code for grouping, releasing the connection with the second UE and connecting to a first UE, displaying the grouping of the first AR glasses connected with the first UE and the second AR glasses on a display of the second AR glasses, and displaying media content generated by the first UE.

According to various embodiments of the disclosure, there may be proposed second AR glasses for grouping with a first UE in a plurality of augmented reality (AR) glasses in a wireless communication system, comprising a transceiver and a processor configured to wirelessly connect the second AR glasses with a second UE, when the second AR glasses are positioned toward the first UE, receive, through the transceiver, connection information for connecting to the first UE from the first UE, release the connection with the second UE, transmit, through the transceiver, information about the second AR glasses to the first UE, display the grouping of the first AR glasses connected with the first UE and the second AR glasses on a display of the second AR glasses, and display media content generated by the first UE.

According to various embodiments of the disclosure, when the second AR glasses are positioned toward the first UE, the connection information may be received through the transceiver after the first UE recognizes that the second AR glasses are positioned within a preset distance and angle range.

According to various embodiments of the disclosure, there may be provided second AR glasses for grouping with a first UE in a plurality of AR glasses in a wireless communication system, comprising a transceiver and a processor configured to wirelessly connect second AR glasses with a second UE, recognize a code for grouping, generated by the first UE, transfer, through the transceiver, information about the second AR glasses to the first UE through the code for grouping, release the connection with the second UE and connect with a first UE, display the grouping of the first AR glasses connected with the first UE and the second AR glasses on a display of the second AR glasses, and display media content generated by the first UE.

MODE FOR CARRYING OUT THE INVENTION

Figure 1:
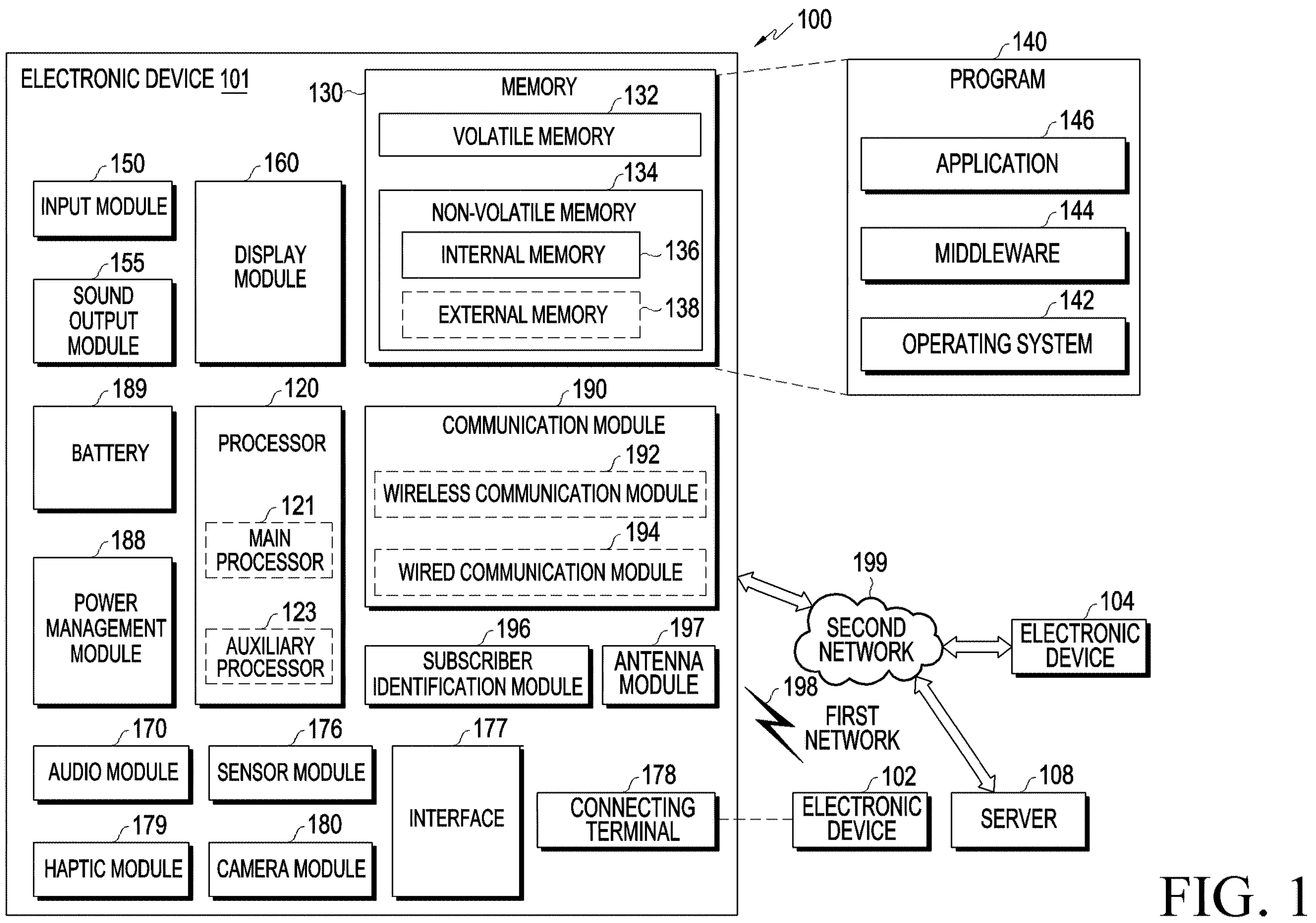
FIG. 1 is a block diagram illustrating an electronic device in a network environment according to various embodiments of the disclosure.

Hereinafter, embodiments of the disclosure are described in detail with reference to the accompanying drawings.

In describing embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments of the disclosure, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

When determined to make the subject matter of the disclosure unnecessarily unclear, the detailed description of known functions or configurations may be skipped in describing embodiments of the disclosure. The terms as used herein are defined considering the functions in the present disclosure and may be replaced with other terms according to the intention or practice of the user or operator. Therefore, the terms should be defined based on the overall disclosure.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
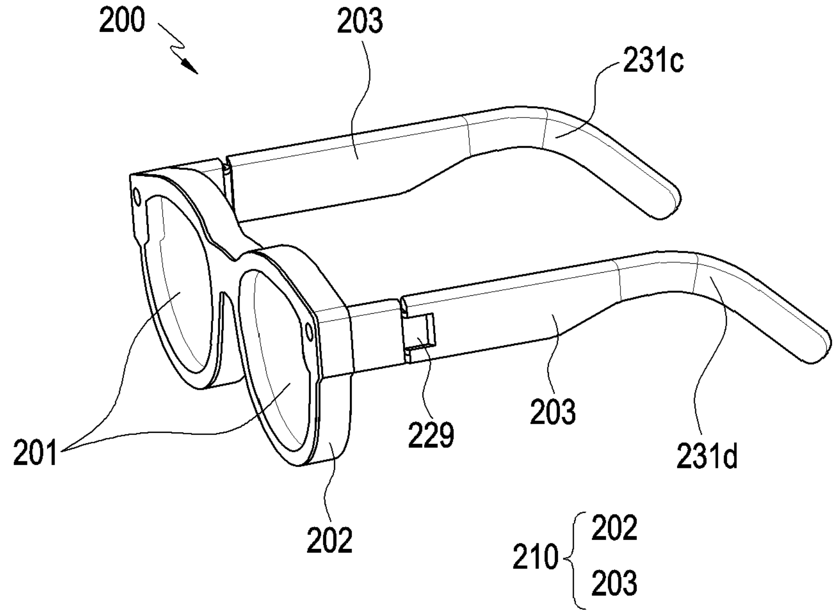
FIG. 2 illustrates AR glasses according to various embodiments of the disclosure.

FIG. 2 illustrates AR glasses according to various embodiments of the disclosure.

Referring to FIG. 2, the electronic device 200 may be a glasses-type wearable electronic device, and the user may visually recognize her surrounding objects or environment while wearing the electronic device 200. For example, the electronic device 200 may be a head-mounted device (HMD) or smart glasses capable of providing images directly in front of the user's eyes. The configuration of the electronic device 200 of FIG. 2 may be identical in whole or part to the configuration of the electronic device 101 of FIG. 1.

According to various embodiments, the electronic device 200 may include a housing that forms the exterior of the electronic device 200. The housing 210 may provide a space in which components of the electronic device 200 may be disposed. For example, the housing 210 may include a lens frame 202 and at least one wearing member 203 including a first wearing member (e.g., one end portion 203*a* of the wearing member of FIG. 2) and a second wearing member (e.g., one end portion 203*b* of the wearing member of FIG. 2).

According to various embodiments, the electronic device 200 may include at least one display member 201 capable of providing the user with visual information. For example, the display member 201 may include a module equipped with a glass, a lens, a display, a waveguide, and/or a touch circuit. According to an embodiment, the display member 201 may be transparent or semi-transparent. According to an embodiment, the display member 201 may include a semi-transparent glass or a window member the light transmittance of which may be adjusted as the coloring concentration is adjusted. According to an embodiment, a pair of display members 201 may be provided and disposed to correspond to the user's left and right eyes, respectively, with the electronic device 200 worn on the user's body.

According to various embodiments, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices 201.

According to various embodiments, the wearing members 203 may extend from the lens frame 202. For example, the wearing members 203 may extend from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231*c* configured to face the user's body and an outer side surface 231*d* opposite to the inner side surface.

According to various embodiments, the electronic device 200 may include the hinge structures 229 configured to fold the wearing members 203 on the lens frame 202. The hinge structure 229 may be disposed between the lens frame 202 and the wearing member 203. While the electronic device 200 is not worn, the user may fold the wearing members 203 on the lens frame 202 to carry or store the electronic device.

Figure 3:
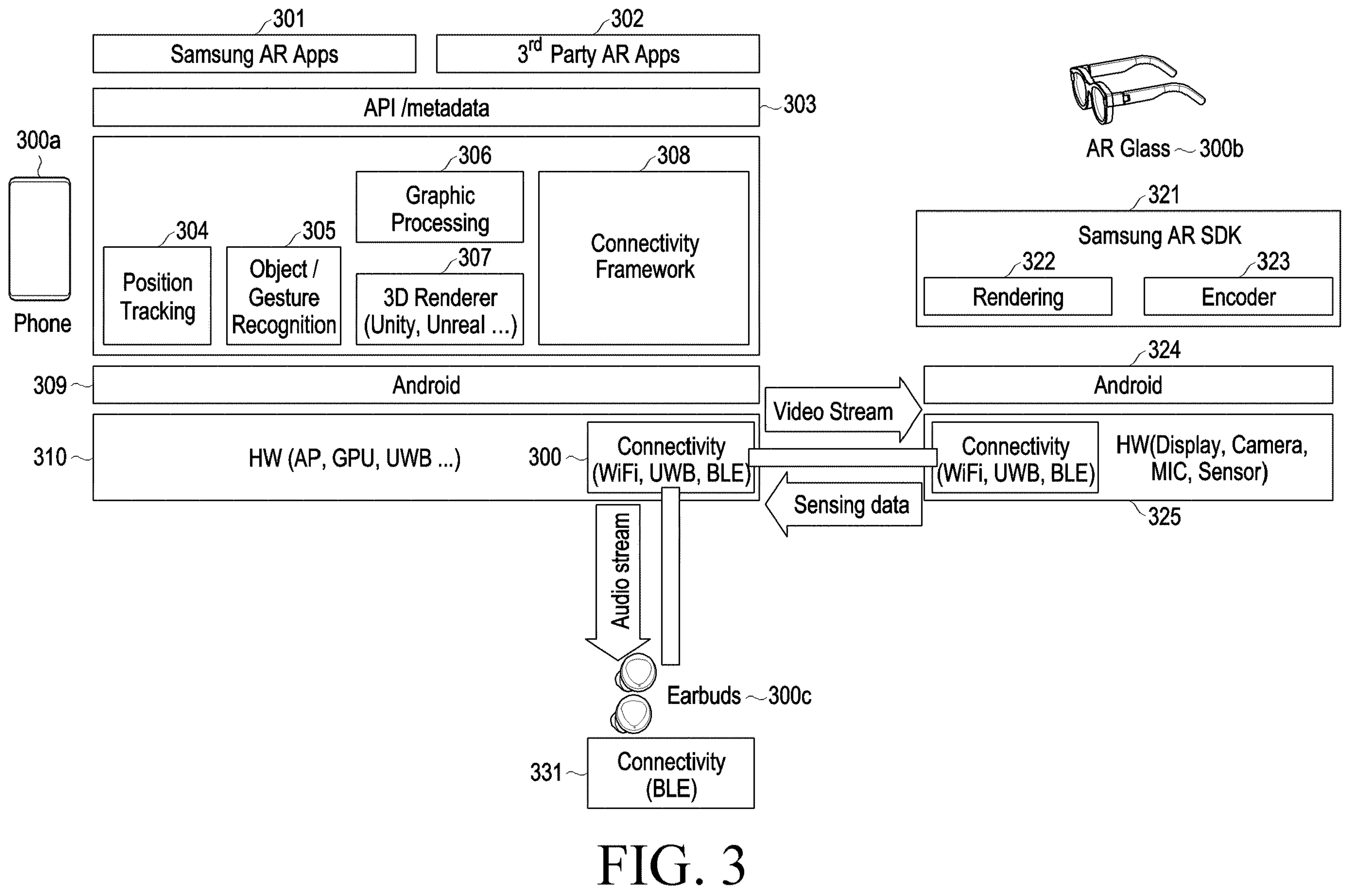
FIG. 3 illustrates a system architecture including a UE and an AR device according to an embodiment of the disclosure.
Figure 4:
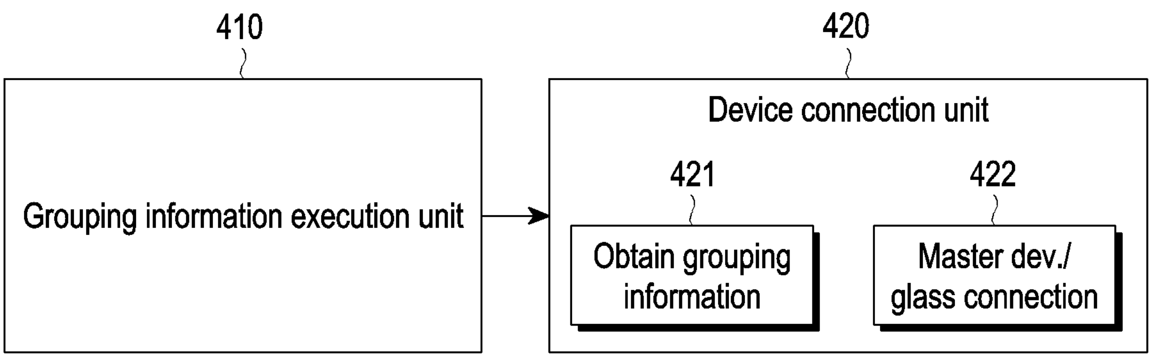
FIG. 4 is a block diagram for executing operations of a UE according to an embodiment of the disclosure.

FIG. 3 illustrates a system architecture including a UE and an AR device according to an embodiment of the disclosure. FIG. 4 is a block diagram for executing operations of a UE according to an embodiment of the disclosure. In the disclosure, the AR device is illustrated as an example, and peripheral devices such as virtual reality (VR) devices, extended reality (XR) devices, and mixed reality (MR) devices can also operate as the disclosure.

The disclosure relates to a method for efficiently grouping a plurality of devices.

According to various embodiments, the UE may operate in a tethered mode in which it is communicatively connected to a glasses-type device (hereinafter, referred to as AR glasses) showing a virtual environment and/or augmented reality. In the disclosure, the AR glasses may serve as the user monitor or a display, and media processing or the like for providing virtual reality or augmented reality data may be provided in an interoperating mobile device rather than AR glasses. The UE may be connected to the AR glasses using a wireless communication scheme such as Wi-Fi and/or UWB, and the user may experience a virtual environment through the UE. Through the tethered mode, the UE may transfer the information about the UE to the AR glasses worn by the user, and the AR glasses may show the information about the UE.

According to various embodiments, the UE may execute an application for driving augmented reality and may search for a plurality of peripheral devices including AR glasses around the UE. For example, in the first UE possessed by the first user, when the first AR glasses worn by the first user and the UE are tethered and a second user is positioned around the first UE, the second AR glasses worn by the second user may be searched. Even if the second AR glasses interoperate with the second UE possessed by the second user, it may be tethered with the second AR glasses to share the media content of the first UE with the first user and the second user. The second AR glasses may be disconnected from the second UE and connected to the first UE, so that the first UE, the first AR glasses, and the second AR glasses may be grouped.

The blocks of FIG. 3 respectively show modules included in the service architecture as to what components may be equipped and what information may be transmitted/received for connection between the UE and the AR device.

According to an embodiment of the disclosure, the UE may detect, select, and connect the second AR device while being connected to the first AR device.

Referring to FIG. 3, the system may include at least one UE 300*a*, at least one AR device 300*b*, and/or at least one peripheral device 300*c*.

As an embodiment, in the system of FIG. 3, the AR device 300*b* may operate in a tethered mode. In the tethered mode, the AR application may be installed and executed only in the UE 300*a*. Also, in the tethered mode, the AR device 300*b* may receive help from the UE 300*a* to process the AR media. For example, in the tethered mode, heavy AR media processing (e.g., 3D object generation processing) of the AR application may be processed by the UE 300*a* alone and provided to the AR device 1200, or may be split and processed by the UE 300*a* and the AR device 300*b*. As an embodiment, the AR device 300*a* may be wirelessly tethered with the UE 300*a* through communication methods such as Wi-Fi, BLE, and 5G.

As an embodiment, the UE 300*a* may be connected to the AR device 300*b* and/or the peripheral device 300*c*. For example, the UE 300*a* may be wirelessly connected to the AR device 300*b* to receive sensing data from the AR device 300*b* and may transmit media data (e.g., a video stream) to the AR device 300*b*. The UE 300*a* may be wirelessly connected to the peripheral device 300*c* to transmit media data (e.g., an audio stream) to the peripheral device 300*c*.

As illustrated in FIG. 3, the UE 300*a* may be, e.g., a mobile device of the user, and may be connected to at least one peripheral device (e.g., the AR device 300*b* and/or the wireless earphone 300*c*).

The AR device 300*b* may be, e.g., AR glasses. As an embodiment, the AR device 300*b* may be the first AR glasses. Alternatively, the AR device 300*b* may be the second AR glasses.

In an embodiment, the UE 300*a* may include at least one application (AR application) for AR, an API/metadata 303, an AR service component including at least one processing module for the AR service, an OS (e.g., Android OS) 309, and/or a hardware component 310.

The at least one AR application may include, e.g., an AR application of the manufacturer of the UE 300*a* (e.g., Samsung AR Apps) 301, and/or a 3rd party AR application 302.

The API/metadata 303 may provide a function and data (e.g., metadata) for interfacing between at least one AR application and another component of the UE 300*a*.

The AR service component may include at least one processing module used to provide the AR service. For example, the AR service component may include a position tracking 304 module, an object/gesture recognition 305 module, a graphic processing 306 module, a 3D renderer 307 module, and/or a connectivity framework 308 module.

The position tracking 304 module may recognize the space through 6 degrees of freedom (DoF) and track the user's position. The position tracking 304 module may include and recognize movement and head tracking of the user (when only the field of view is changed by moving the user's head without moving the position).

The object/gesture recognition 305 module may recognize an object and a gesture. For example, the object/gesture recognition 305 module may recognize external objects (peripheral devices) or gestures of the user's hand gesture by analyzing an image captured through a camera of the AR device interoperating with the UE 300*a*.

The graphic processing 306 is a module for graphic processing, and the 3D renderer 307 is a module for generating a 3D object to be displayed on the AR device 300*b*, and may use, e.g., an external 3rd party library such as Unity or Unreal.

The connectivity framework 308 module may support connectivity 300 such as Wi-Fi, UWB, BLE, etc. including a Wi-Fi tethered mode.

In an embodiment, the AR device 300*b* may include an AR service component 321 including at least one processing module for an AR service, an OS (e.g., Android OS) 324, and/or a hardware component 325.

As an embodiment, the AR service component 321 may include a rendering 322 module for rendering and displaying a 3D object transferred from the phone 300*a* on the display and/or an encoder 323 module for supporting compression to transfer an image (image, video) captured by the camera 325 of the glass 300*b* to mobile.

When the UE 300*a* and the AR device 300*b* are connected through wireless communication, the UE 300*a* may provide content (e.g., a video stream) to the AR device 300*b*, may display the content through the HW 325 of the AR device 300*b*, or may transmit, to the UE 300*a*, data sensed according to the movement of the user or a surrounding environment.

In general, a UE and an AR device may allow the user to experience virtual reality even in a wired network form. According to an embodiment of the disclosure, it is possible to provide the user with immersive augmented reality through an AR device by connectivity, such as Wi-Fi, UWB, or BLE which is a wireless network form Further, it is possible to increase the accuracy of detecting a specific AR device to be connected to the UE according to a connection method such as UWB, so that one master device may provide the same content to selected users.

Hereinafter, various embodiments of the disclosure are described under the assumption that the AR device is AR glasses. However, embodiments are not limited thereto, and various embodiments of the disclosure may be applied to other types of AR devices (e.g., AR lenses) that perform the functions of the AR devices of the disclosure.

Referring to FIG. 4, the grouping information execution unit 410 may perform at least one operation for processing grouping information for grouping a plurality of AR glasses. For example, the grouping information execution unit 410 may perform operations for generating and/or displaying grouping information.

The device connection unit 420 may perform an operation 421 for obtaining grouping information and/or an operation 422 for connecting a master device (e.g., a UE) and glasses (e.g., AR glasses). In an embodiment, the device connection unit 420 may obtain grouping information through operation 421, and may connect AR glasses to the UE through operation 422 based on the grouping information.

In an embodiment, the grouping information execution unit 410 and the device connection unit 420 may be included in the UE. In another embodiment, the grouping information execution unit 410 may be included in the UE, and the device connection unit 420 may be included in the AR glasses. In another embodiment, the grouping information execution unit 410 and the device connection unit 420 may be included in the AR glasses.

According to various embodiments, when the user executes an application, the grouping information may be displayed on the application so that users positioned nearby may further participate. There may be various scenarios regarding how the second AR glasses worn by a new user (e.g., the second user) and the first UE may be recognized and connected to each other.

According to various embodiments, the first user may indicate the second user who wears the second AR glasses or the second AR glasses to be connected. The first UE possessed by the first user may detect second AR glasses within a specific range of the first UE. For example, other peripheral devices than the second AR glasses to be connected to the first UE may be present. For example, the UWB wireless communication may be used to measure the distance between the first UE and the second AR glasses and what direction it is positioned from the first UE. For example, when the first UE points toward the position of the second AR glasses to be connected, the second AR glasses positioned within a specific distance and angle range from the first UE may be targeted and detected.

According to various embodiments, by using the UWB wireless communication scheme, it is possible to clearly identify the user positioned within a specific radius by setting a distance and an angle with respect to the UE, thereby recognizing other UEs or peripheral devices. For example, the first UE may be pointed toward the direction in which the second AR glasses to be connected are present, and the distance and the angle may be measured using the UWB wireless communication scheme. The first user may perform detection and selection within a predetermined range through pointing toward the second AR glasses. As another example, in the second UE interoperating with the second AR glasses, the second UE may display information about the first UE. For example, when the user wearing the glasses of the second AR glasses looks at the second UE, the information about the first UE may be read through the camera mounted on the glasses of the second AR glasses. After interpreting the information about the first UE, the second AR glasses may be connected to the first UE. After the second AR glasses and the first UE are connected, the first UE may identify the connection of the first AR glasses and the second AR glasses and group them. The grouped first AR glasses and second AR glasses may provide the same AR application service. For example, the grouped first AR glasses and second AR glasses may display media content of the same AR application provided by the first UE, and the first user and the second user may participate in the same media content.

Figure 5:
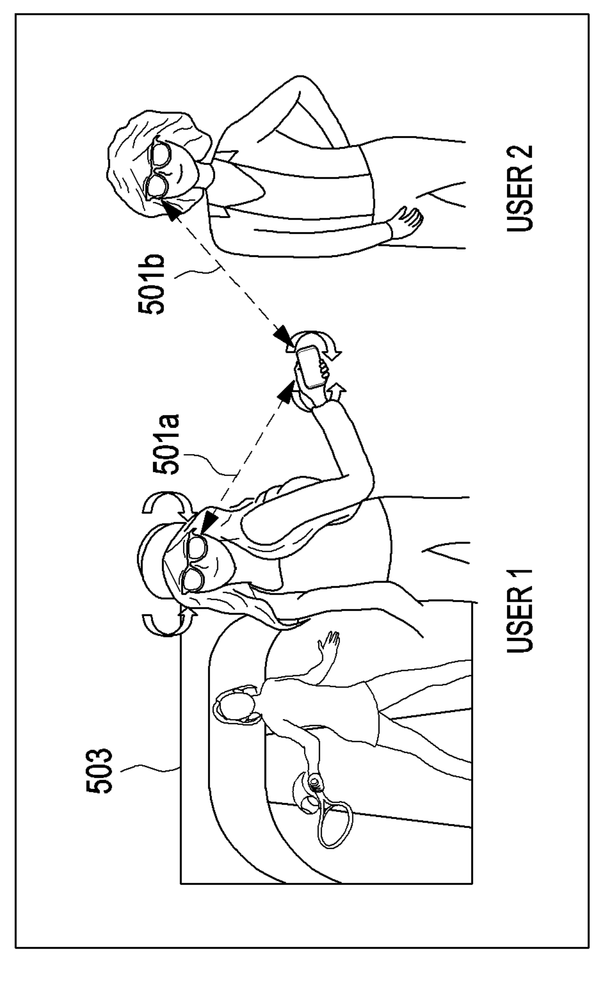
FIG. 5 illustrates an example in which first AR glasses and second AR glasses are grouped in the first AR glasses connected to a first UE and the second AR glasses connected to a second UE according to an embodiment of the disclosure.
Figure 5:
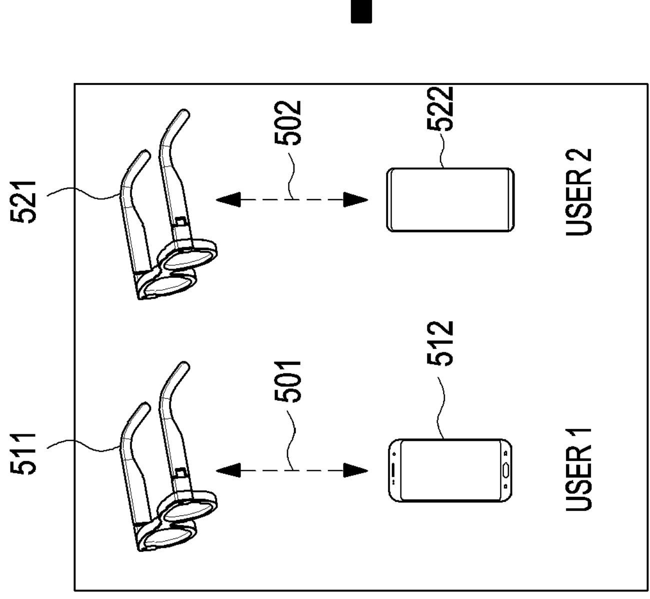
Figure 6:
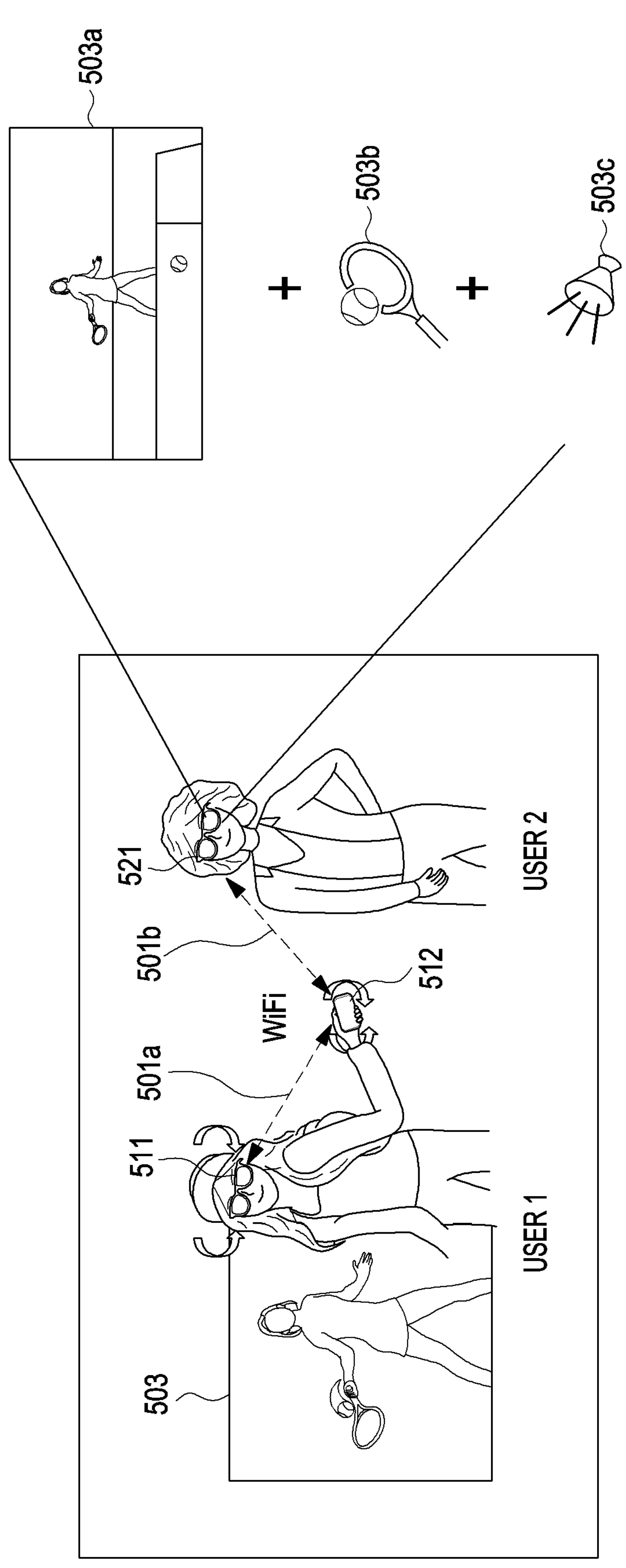
FIG. 6 illustrates a method for providing an AR service through a plurality of AR glasses grouped on an application executed on a first UE according to an embodiment of the disclosure.

FIG. 5 illustrates an example in which first AR glasses and second AR glasses are grouped in the first AR glasses connected to a first UE and the second AR glasses connected to a second UE according to an embodiment of the disclosure. FIG. 6 illustrates a method for providing an AR service through a plurality of AR glasses grouped on an application executed on a first UE according to an embodiment of the disclosure.

Referring to FIG. 5, the first AR glasses 511 and the second AR glasses 521 may be connected to the same UE 512 and may be grouped by the corresponding UE. In this case, the UE 512 may provide the service 503 of the same AR application through the first AR glasses 511 and the second AR glasses 521. For example, the UE 512 may provide the same AR application 503 (e.g., a sports game requiring multiple participants) through the first AR glasses 511 and the second AR glasses 521.

Referring to FIG. 5, the first UE 512 of the first user may be connected to the first AR glasses 511 (501), and the second UE 522 of the second user may be connected to the second AR glasses 521 (502). In other words, the UE of each user may be connected to their respective AR glasses 501 and 502.

In this case, the first AR glasses 511 and the second AR glasses 521 may need to be grouped through the first UE 512. For example, the first AR application 503 (e.g., an AR sports game application) provided by the first UE 512 through the first AR glasses 511 may need to be simultaneously provided through the first AR glasses 511 and the second AR glasses 521 in the dual glass mode. In this case, the first UE 512 needs to group the first AR glasses 511 and the second AR glasses 521.

Referring to FIG. 6, in order to group the first AR glasses 511 and the second AR glasses 521, the first AR glasses 511 and the second AR glasses 521 together need to be connected to the first UE 512 together (501*a* and 501*b*). The UE 512 may group the first AR glasses 511 and the second AR glasses 521, which are connected together, for use of the same AR application 503.

In this case, the UE 512 may provide images 503, 503*a*, 503*b*, and 503*c* of the corresponding application 503 associated with each AR glasses, respectively. For example, as illustrated, when the AR sports game application 503 is an AR tennis game application, the UE may provide a first image 503 in which the tennis ball approaches to its first AR glasses 511 and may provide a second image 503*a* in which the tennis ball moves away to the second AR glasses 521 of the counterpart. Further, when the current time point is the moment when the first user wearing the first AR glasses 511 hits the ball, the UE may provide a third image 503 providing the image/sound of the racket hitting the ball to the first AR glasses 511 and may provide a fourth image 503*c* providing the image/sound of the counterpart hitting the ball to the second AR glasses 521 of the counterpart. Accordingly, an appropriate image for the corresponding AR service may be provided to the user of each AR glasses.

Hereinafter, a method in which the first UE connects the second AR glasses is described with reference to FIGS. 5 to 6.

According to various embodiments, information for grouping to the AR glasses 521 of the second user may be displayed to allow the first user to add the second user through the first AR glasses 511 when the first UE 512 executes the game application (sports application). The second AR glasses 521 may be connected to the second UE 522 (502). Alternatively, the first UE 512 may simultaneously select and connect the first AR glasses 511 and the second AR glasses 521 (501*a* and 501*b*). The connection method may use Wi-Fi, BLE, and/or UWB methods.

According to various embodiments, the second AR glasses 521 may be connected to the first UE 512 and grouped together with the first AR glasses 511, and the media content 503 through the game application operated in the first UE 512 may be shared by the first AR glasses 511 and the second AR glasses 521. For example, when the first UE, the first AR glasses 511, and the second AR glasses 521 are grouped, the user wearing the first AR glasses 511 and the user wearing the second AR glasses 521 may perform interactive sports games 503*a*, 503*b*, and 503*c* through the game application 503 operated by the first UE 512. Since media content is shared using one master device, it is possible to feel the reality of playing a real sports game at a high synch rate.

According to an embodiment, the first AR glasses 511 and the second AR glasses 521 may be grouped so that the first user and the second user may interactively play the tennis game 503 executed in the first UE 512. For example, the first user may toss the tennis ball to the counterpart in the tennis game, and the second user may receive the tennis ball tossed by the first user in a state 503*a* in which the second user faces the first user (503*b*). While the first user and the second user play tennis games, the two users may feel as if they are in one space at the same time.

According to various embodiments, there may be several methods for connecting the second AR glasses to the first UE. Embodiments of FIGS. 7 to 10 describe a method for connecting a UE and counterpart AR glasses (second AR glasses) from the perspective of a UX scenario. In the embodiments of FIGS. 7 to 10, the UE may be already connected to its AR glasses (first AR glasses).

Figure 7:
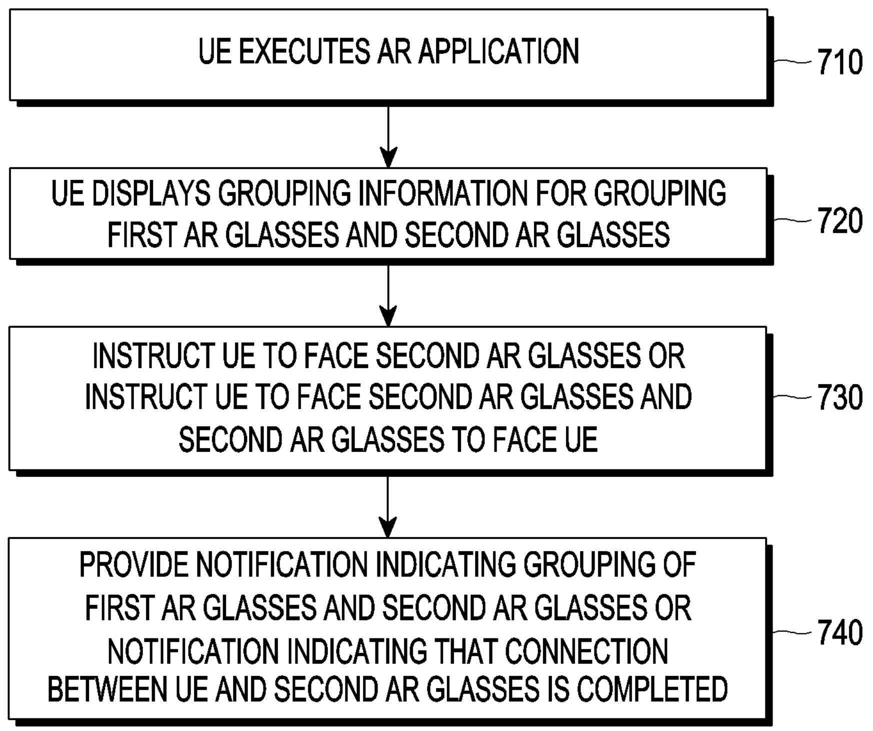
FIGS. 7 and 8 are block diagrams illustrating a method for connecting and grouping a UE and counterpart AR glasses according to an embodiment of the disclosure.

Referring to FIG. 7, the UE may execute the AR application in the UE (710). As an embodiment, the AR application may be executed in the UE by a user input. As an embodiment, the AR application may be an AR sports application and may be provided through the first AR glasses. The UE may display grouping information for grouping the first AR glasses and the second AR glasses (720). According to an embodiment, when group participation in the UE of the second AR glasses is identified, the UE may display grouping information. For example, when the dual glass mode in which the first AR application is simultaneously provided through the first AR glasses and the second AR glasses is selected, the UE may identify group participation in the UE of the second AR glasses. The UE may be instructed to face the second AR glasses (or the second user wearing the second AR glasses), or the UE may be instructed to face the second AR glasses (or the second user wearing the second AR glasses), and the second AR glasses (or the second user wearing the second AR glasses) may be instructed to face the UE (or the screen of the UE) (730). As an embodiment, the instruction (guide) may be provided visually and/or audibly through the UE, the first AR glasses, and/or the second AR glasses. According to this instruction (guide), the UE and the second AR glasses may be placed in a state of being connectable to each other, and may be connected to each other according to a predefined connection method. The UE, the first AR glasses, and/or the second AR glasses may provide (740) a notification indicating that the connection between the UE and the second AR glasses is completed. Further, the UE, the first AR glasses, and/or the second AR glasses may provide a notification indicating grouping of the first AR glasses and the second AR glasses.

As an embodiment, the notification (first notification) indicating grouping may be provided together with or separately from the notification (second notification) indicating connection completion. As an embodiment, the first notification and the second notification may be provided visually and/or audibly. As an embodiment, the first notification and the second notification may be provided from the UE, the first AR glasses, and/or the second AR glasses.

According to various embodiments, although, e.g., a third user who is irrelevant is present around the first UE, under the assumption of UWB communication method, it is possible to clearly determine a user within a specific radius by measuring the distance and angle from the second user who is relevant. Thus, such a setting may be made that connection with a device within the radius of the first UE is made. Even if it is not a UWB communication method, it may be connected in a more intuitive manner.

According to various embodiments, the first UE may point toward the device to be connected. Here, because the distance and the angle may be measured through the UWB communication method, only devices within a predetermined angle range may be detected and selected.

Figure 8:
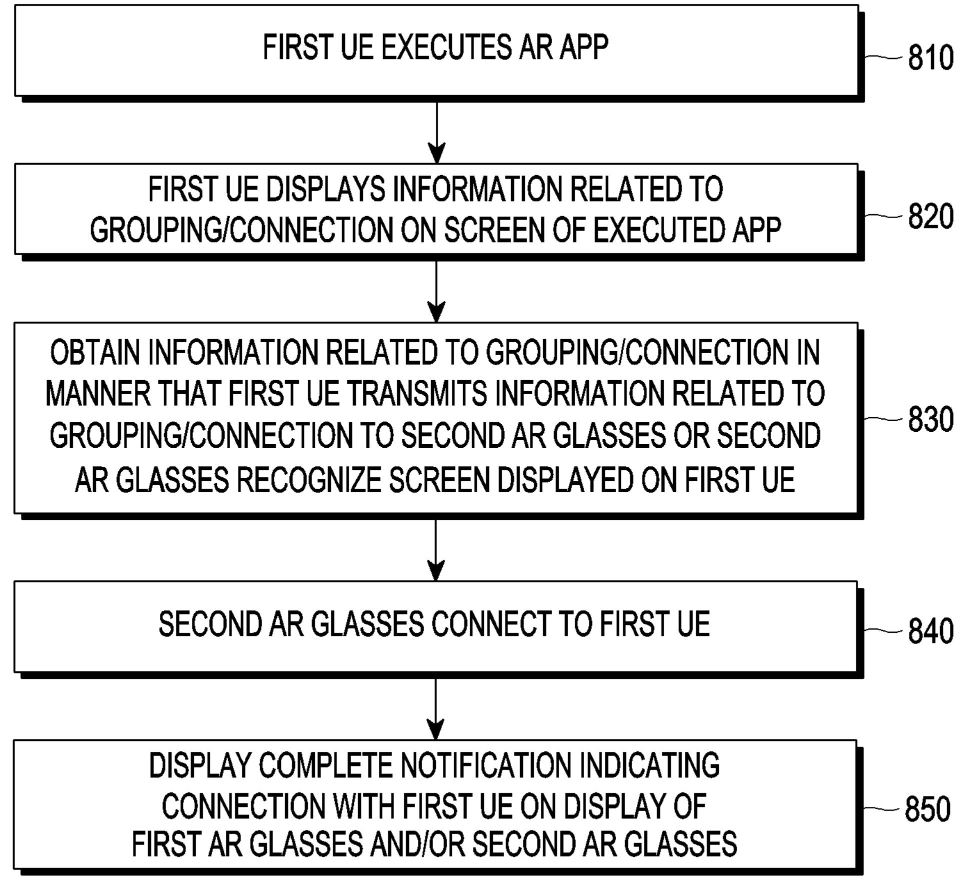

In the embodiment of FIG. 8, a method for connecting and grouping counterpart AR glasses (second AR glasses) from a point of view of the first UE is described. Referring to FIG. 8, the first UE which is the master device may execute an AR application (810). The first UE may display information related to grouping/connection (hereinafter, referred to as grouping information) on the screen of the executed application (820). A list of peripheral devices that may be connected to the first UE may be displayed on the information related to grouping/connection. In the peripheral device list, the second AR glasses to be connected may be displayed at the top. For example, a peripheral device placed in a straight line with the direction in which the first UE faces may be displayed as a device to be connected first. The information related to grouping/connection may be obtained in a manner in which the first UE transmits the grouping/connection-related information to the second AR glasses or the second AR glasses recognizes the screen displayed on the first UE (830). Through the above method, the second AR glasses may be connected to the first UE (840). A completion notification indicating that the first UE is connected may be displayed on the display of the first AR glasses and/or the second AR glasses (850).

According to various embodiments, the second UE may actively generate information capable of connecting to the first UE in a predetermined form, such as a QR code or a barcode. In a method in which the display of the second AR glasses gazes at the screen of the second UE, the QR code or barcode may be recognized, and the first UE and the second AR glasses may be connected. The first UE may identify that the second AR glasses and the first AR glasses are connected, and group them and play game.

Figure 9:
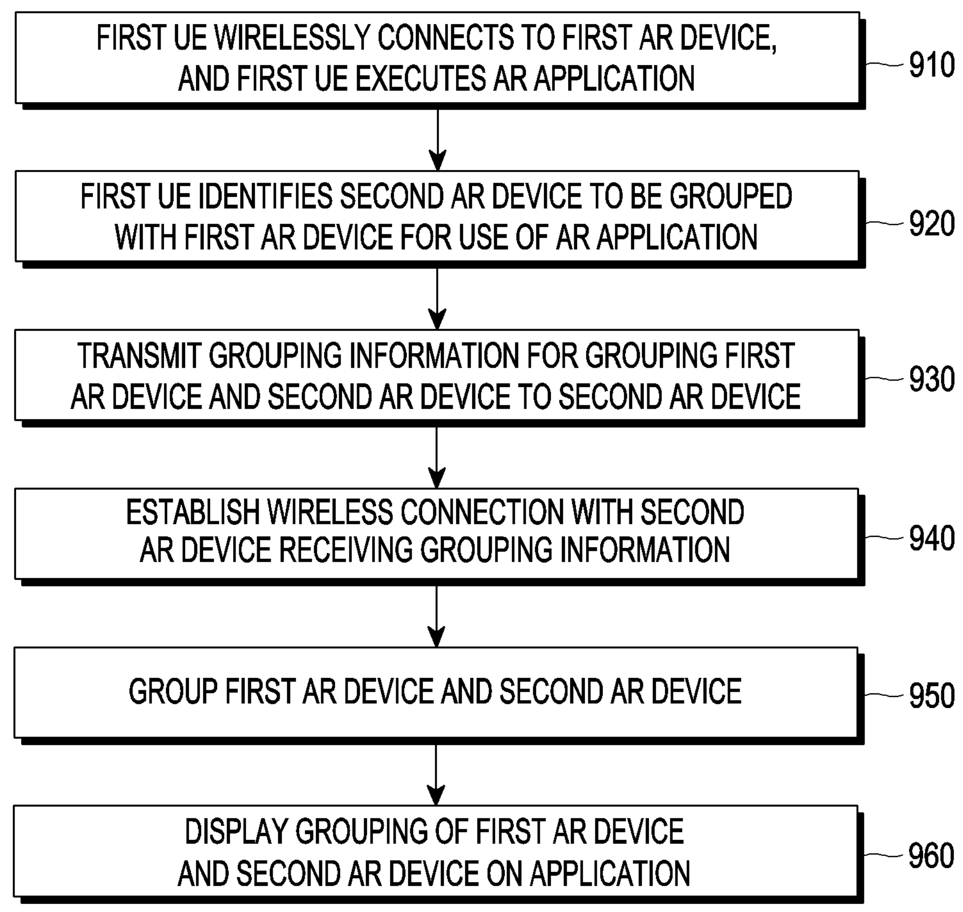
FIG. 9 illustrates an embodiment of a first UE according to the disclosure.

FIG. 9 illustrates an embodiment of a first UE according to the disclosure.

According to an embodiment, in the operation of the first UE for grouping the plurality of augmented reality (AR) devices in the wireless communication system, the first UE may be wirelessly connected to the first AR device and may execute the AR application in the first UE (910). The first UE may identify the second AR device to be grouped with the first AR device for use of the AR application (920). Grouping information for grouping the first AR device and the second AR device may be transmitted to the second AR device (930), and a wireless connection with the second AR device receiving the grouping information may be established (940), grouping the first AR device and the second AR device (950). The application may display 960 the grouping of the first AR device and the second AR device.

According to an embodiment, in the operation of the second AR device in the plurality of AR devices grouped in the wireless communication system, the second AR device to be grouped with the first AR device may be identified by the first UE by executing the AR application in the first UE wirelessly connected to the first AR device. Grouping information for grouping the first AR device and the second AR device may be received from the first UE, and the second AR device receiving the grouping information may establish a wireless connection with the first UE, so that the first AR device and the second AR device may be grouped. In this case, the second AR device may release the connection with the second UE. The grouping of the first AR device and the second AR device may be displayed on the application executed by the first UE and may be displayed through the glass of the second AR device.

Figure 10:
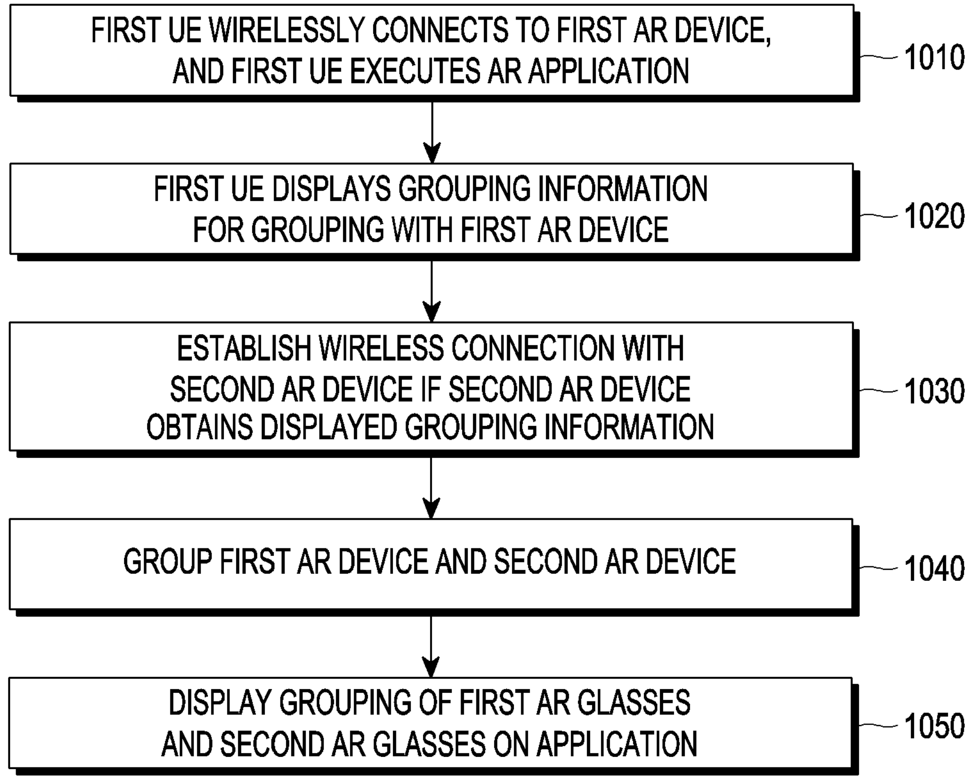
FIG. 10 illustrates another embodiment of a first UE according to the disclosure.

FIG. 10 illustrates another embodiment of a first UE according to the disclosure.

According to another embodiment, in the operation of the first UE for grouping the plurality of AR devices in the wireless communication system, the first UE may be wirelessly connected to the first AR device and may execute the AR application in the first UE (1010). The first UE may display grouping information for grouping with the first AR device (1020), if the second AR device obtains the displayed grouping information, establish a wireless connection with the second AR device (1030), and group the first AR device and the second AR device (1040). The first UE may display the grouping of the first AR glasses and the second AR glasses on the application (1050).

According to another embodiment, in the operation of the second AR device among a plurality of AR devices grouped in the wireless communication system, if the first UE wirelessly connected with the first AR device executes an AR application, grouping information for grouping with the second AR device may be displayed. The second AR device may obtain the displayed grouping information, and the first UE may establish a wireless connection with the second AR device, and the first AR device and the second AR device may be grouped. The grouping of the first AR glasses and the second AR glasses may be displayed on the application of the first UE.

Figure 11:
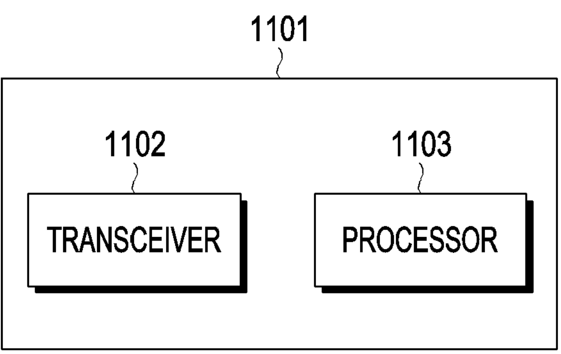
FIG. 11 illustrates a UE according to the disclosure.

FIG. 11 illustrates a UE according to the disclosure.

In the disclosure, a UE 1101 may include a transceiver 1102 and a processor 1103. The UE may perform the operations disclosed in FIGS. 3 to 10 through the transceiver 1102 and the processor 1103.

As an example in the disclosure, before UWB is operated, BLE may first identify a target to communicate with from a distance, and then BLE may identify peripheral devices within a predetermined area and UWB communication may be performed when they enter the certain area. UWB communication may be operated to perform a measurement operation when recognizing that the UE and the peripheral device are positioned close to each other after sync is made between both ends.

According to the disclosure, it may be desirable to utilize the UWB positioning method, which is a more accurate positioning method than BLE. When using BLE, the UE may recognize peripheral devices based on the boundary of the signal strength of multiple peripheral devices. However, determining the boundary through signal strength may have difficulty in selecting or maintaining the desired shape and size, as well as selecting a specific target positioned in an accurate distance and direction. The disclosure may calculate the distance between specific AR glasses and the direction in which the UE points among a plurality of peripheral devices to select and connect specific AR glasses to be grouped with the UE and provide an advantage of expecting excellent performance regardless of surrounding RF signals.

According to the disclosure, when the UWB communication method is used, a specific user may be selected through angle of arrival (AoA) and the UE to be connected. For example, although connected with the second user through BLE, the address or password of the first UE may be provided to the second AR glasses through a UWB channel connection via UWB ranging and AoA. As another example, when the second AR glasses receive information related to the first UE through information displayed on the first UE, information may be transferred through, e.g., Wi-Fi, despite not passing through the UWB channel.

As conventional methods, a method of wireless connection after searching for peripheral devices present within a predetermined area from one master device, a method of controlling a plurality of peripheral devices after one master device collectively interoperates with a plurality of peripheral devices, a method in which in a state in which a plurality of UEs around one server (network) are connected, each UE is connected with the respective headmount (peripheral device), or a method of finding a specific peripheral device for one-to-one connection with the specific peripheral device by the first user among several peripheral devices may be used.

According to the disclosure, there is proposed a method in which a first UE in a state connected with first AR glasses (tethered mode) detects and groups new second AR glasses. Further, according to the disclosure, it is possible to provide multiple users with a more realistic virtual environment through a grouping connection operated under the control of one master device by connecting multiple peripheral devices in a stand-alone wireless method. It is also possible to provide an advantage in which multiple users may simultaneously enjoy sports in a virtual environment.

The invention claimed is:

1. A method by a first user equipment (UE) grouping a plurality of peripheral devices in a wireless communication system, the method comprising:

executing an application, wherein the first UE is wirelessly connected with a first peripheral device;

identifying a second peripheral device to be grouped with the first peripheral device for use of the application, wherein the second peripheral device is wirelessly connected with a second UE;

transmitting, to the second peripheral device, grouping information for grouping the first peripheral device and the second peripheral device;

establishing a wireless connection with the second peripheral device based on a code in a predetermined form generated by the second UE, wherein the predetermined form includes at least one of a barcode or a QR code readable by the second peripheral device;

grouping the first peripheral device and the second peripheral device; and displaying information about the grouping of the first peripheral device and the second peripheral device on the application, wherein the application provides different augmented reality (AR) media of a same media content respectively to the first peripheral device and the second peripheral device.

2. The method of claim 1, wherein identifying the second peripheral device to be grouped with the first peripheral device includes:

measuring a distance and a direction to the second peripheral device; and recognizing that the second peripheral device is positioned within a preset distance and angle range.

3. The method of claim 1, wherein a connection between the second peripheral device and a second UE is released by establishing the wireless connection between the second peripheral device and the first UE.

4. The method of claim 1, further comprising:

displaying the grouping information for grouping with the first peripheral device on the application.

5. The method of claim 4, wherein the first peripheral device and the second peripheral device comprise at least one of an AR device or a virtual reality (VR) device, extended reality (XR) devices, and mixed reality (MR) devices.

6. The method of claim 1, wherein identifying the second peripheral device to be grouped with the first peripheral device includes:

identifying the second peripheral device using Bluetooth low energy (BLE); and starting communication with the second peripheral device using ultra-wide band (UWB) based on determining that the second peripheral device is within a predetermined area.

7. A first user equipment (UE) grouping a plurality of peripheral devices in a wireless communication system, comprising:

a transceiver;

memory, comprising one or more storage media, storing instructions; and at least one processor coupled to the transceiver and the memory, wherein the instructions, when executed by the at least one processor individually or collectively, cause the first UE to:

execute an application, wherein the first UE is wirelessly connected with a first peripheral device, identify a second peripheral device to be grouped with the first peripheral device for use of the application, wherein the second peripheral device is wirelessly connected with a second UE, transmit, to the second peripheral device through the transceiver, grouping information for grouping the first peripheral device and the second peripheral device, establish a wireless connection with the second peripheral device, based on a code in a predetermined form generated by the second UE, wherein the predetermined form includes at least one of a barcode or a QR code readable by the second peripheral device, group the first peripheral device and the second peripheral device, and display information about the grouping of the first peripheral device and the second peripheral device on the application, wherein the application provides different augmented reality (AR) media of a same media content respectively to the first peripheral device and the second peripheral device.

8. The first UE of claim 7, wherein the instructions, when executed by the at least one processor individually or collectively, further cause the first UE to:

measure a distance and a direction to the second peripheral device to identify the second peripheral device to be grouped with the first peripheral device, and recognize that the second peripheral device is positioned within a preset distance and angle range.

9. The first UE of claim 7, wherein a connection between the second peripheral device and a second UE is released by establishing the wireless connection between the second peripheral device and the first UE.

10. The first UE of claim 7, wherein the instructions, when executed by the at least one processor individually or collectively, further cause the first UE to display grouping information with the first peripheral device on the application.

11. The first UE of claim 7, wherein the first peripheral device and the second peripheral device comprise at least one of an AR device or a virtual reality (VR) device, extended reality (XR) devices, and mixed reality (MR) devices.

12. A method by a second peripheral device for grouping with a first user equipment (UE) in a plurality of peripheral devices in a wireless communication system, the method comprising:

receiving, from the first UE, grouping information for grouping a first peripheral device and the second peripheral device based on an application executed on the first UE wirelessly connected with the first peripheral device, wherein the second peripheral device is wirelessly connected with a second UE;

scanning a code in a predetermined form generated by the second UE, wherein the predetermined form includes at least one of a barcode or a QR code readable by the second peripheral device;

wirelessly connecting to the first UE based on the grouping information and the scanned code, and releasing a connection with the second UE;

displaying information about the grouping of the first peripheral device and the second peripheral device on a display of the second peripheral device; and displaying the application executed on the first UE, wherein the application provides different augmented reality (AR) media of a same media content respectively to the first peripheral device and the second peripheral device.

13. The method of claim 12, wherein receiving the grouping information for grouping the first peripheral device and the second peripheral device from the first UE includes:

receiving the grouping information in case that the second peripheral device is positioned within a preset distance and angle range with the first UE.

14. The method of claim 12, wherein the first peripheral device and the second peripheral device comprise at least one of an AR device or a virtual reality (VR) device, extended reality (XR) devices, and mixed reality (MR) devices.

15. A second peripheral device for grouping with a first user equipment (UE) in a plurality of peripheral devices in a wireless communication system, comprising:

a transceiver;

memory, comprising one or more storage media, storing instructions; and at least one processor coupled to the transceiver and the memory, wherein the instructions, when executed by the at least one processor individually or collectively, cause the second peripheral device to:

receive, from the first UE, grouping information for grouping a first peripheral device and the second peripheral device based on an application executed on the first UE wirelessly connected with the first peripheral device, wherein the second peripheral device is wirelessly connected with a second UE, scan a code in a predetermined form generated by the second UE, wherein the predetermined form includes at least one of a barcode or a QR code readable by the second peripheral device, wirelessly connect to the first UE based on the grouping information and the scanned code, and release a connection with the second UE, display information about the grouping of the first peripheral device and the second peripheral device on a display of the second peripheral device, and display the application executed on the first UE, wherein the application provides different augmented reality (AR) media of a same media content respectively to the first peripheral device and the second peripheral device.

16. The second peripheral device of claim 15, wherein the instructions, when executed by the at least one processor individually or collectively, further cause the second peripheral device to receive the grouping information in case that the second peripheral device is positioned within a preset distance and angle range with the first UE.

17. The second peripheral device of claim 15, wherein the first peripheral device and the second peripheral device comprise at least one of an AR device or a virtual reality (VR) device, extended reality (XR) devices, and mixed reality (MR) devices.

* * * * *